(12) United States Patent
Nakamura

(10) Patent No.: US 7,138,074 B1
(45) Date of Patent: Nov. 21, 2006

(54) PROCESS OF PREPARATION OF RARE EARTH SILICATE PHOSPHOR

(75) Inventor: Shigeru Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/799,885

(22) Filed: Mar. 15, 2004

(30) Foreign Application Priority Data

Mar. 14, 2003 (JP) .............................. 2003-070441

(51) Int. Cl.
*C09K 11/79* (2006.01)
(52) U.S. Cl. .............................................. 252/301.4 F
(58) Field of Classification Search ......... 252/301.4 F; 423/263, 326
See application file for complete search history.

(56) References Cited

U.S. PATENT DOCUMENTS 4,931,312 A * 6/1990 de Leeuw et al. ............ 427/64

5,003,181 A 3/1991 Morlotti

FOREIGN PATENT DOCUMENTS

JP 06-287553 10/1994

OTHER PUBLICATIONS

A. Meijerink, W.J. Schipper and G. Blasse, *Photostimulated Luminescence and Thermally Stimulated Luminescence of $Y_2SiO_5$-Ce, Sm*, J. Phys. D: Appln. Phys. 24 (1991), pp. 997-1002, © 1991, IOP Publishing Ltd., Printed in the UK.
R. Visser, C.L. Melcher, J.S. Schweitzer, H. Suzuki and T.A. Tombrello, *Photostimulated Luminescence and Thermoluminiscence of LSO Scintillators*, IEEE Transactions on Nuclear Science, vol. 41, No. 4, Aug. 1994, pp. 689-693.

* cited by examiner

*Primary Examiner*—C. Melissa Koslow
(74) *Attorney, Agent, or Firm*—Sughrue Mion, PLLC

(57) ABSTRACT

A rare earth element-activated rare earth silicate phosphor is prepared by the steps of (1) heating a rare earth carboxylate with an alkoxyalcohol to obtain a solution; (2) adding to the solution a silicon alkoxide and a compound of the element A, to prepare a mixture; and (3) subjecting the mixture to thermal decomposition.

6 Claims, No Drawings

PROCESS OF PREPARATION OF RARE EARTH SILICATE PHOSPHOR

FIELD OF THE INVENTION

The invention relates to a new process for preparation of a rare earth silicate phosphor.

BACKGROUND OF THE INVENTION

A rare earth silicate ($Ln_2SiO_5$:A in which Ln is Y, Gd and/or Lu; and A is Ce, Sm, Eu, Tb and/or Zr) is known as a stimulable phosphor [for example, as described in J. Phys. D: Appl. Phys., vol. 24 (1991), pp. 997–1002]. When the stimulable phosphor is exposed to radiation or ultraviolet rays (primary excitation), the phosphor absorbs and stores a portion of the energy of radiation or ultraviolet rays. The stimulable phosphor then emits stimulated light in the visible wavelength region when exposed to electromagnetic wave such as visible light or infrared rays (secondary excitation). The stimulable phosphor is practically utilized in a radiation image recording and reproducing method, and JP-2,00,696A and JP-3,290,497B propose use of the rare earth silicate in the method as a phosphor of a radiation image storage panel (which is also referred to as "imaging plate").

The radiation image recording and reproducing method employs a radiation image storage panel containing an energy-storing phosphor such as the stimulable phosphor. A typical process of the method comprises the steps of causing the stimulable phosphor of the storage panel to absorb radiation energy having passed through an object or having radiated from an object; sequentially exciting the phosphor with a stimulating light (such as a laser beam) to emit stimulated light; and photoelectrically detecting the emitted light to obtain electric signals giving a visible radiation image. The storage panel thus processed is subjected to a step for erasing radiation energy remaining therein, and then stored for the use in the next recording and reproducing procedure. Thus, the radiation image storage panel can be repeatedly used.

JP-2001-255,610A discloses a radiation image forming method, which is an alternative process of the radiation image recording and reproducing method. The stimulable phosphor of the storage panel used in the conventional recording and reproducing process plays both roles of radiation-absorbing function and energy-storing function. However, those two functions can be separated in the process. In the process, a radiation image storage panel comprising the stimulable phosphor (which stores radiation energy) is used in combination with a phosphor screen comprising a different phosphor which absorbs radiation and spontaneously emits ultraviolet or visible light. This process comprises the steps of causing the radiation-absorbing phosphor of the phosphor screen to absorb and convert the radiation having passed through an object or having radiated from an object into ultraviolet or visible light; causing the energy-storing phosphor (i.e., stimulable phosphor) of the storage panel to store the energy of the converted light as radiation image information; sequentially exciting the stimulable phosphor with a stimulating ray to emit stimulated light; and photoelectrically detecting the emitted light to obtain electric signals, whereby giving a visible radiation image.

In the radiation image recording and reproducing method (and in the radiation image forming method), it is required to obtain a clear image with a small dose of radiation. In consideration of this requirement, the radiation image storage panel (or the phosphor screen) preferably has a phosphor layer in which the phosphor is so densely packed that the radiation is efficiently absorbed. Accordingly, the phosphor preferably has a high true density.

It is known that lutetium silicate has a high true density (7.4 g/cm$^3$) and that a silicate phosphor comprising lutetium has a high melting point (higher than 2,000° C.). Accordingly, the silicate phosphor has been hitherto prepared by the steps of melting starting materials at a very high temperature (above 2,000° C.) and gradually drawing up a single crystal of the phosphor from the melt. It is, therefore, not easy to prepare the lutetium silicate phosphor, and hence it is desired that a rare earth silicate phosphor having a high true density, particularly a silicate phosphor containing a heavy rare earth such as lutetium, be more easily prepared.

The rare earth silicate phosphor is also known to absorb radiation such as X-rays and instantly emit a light in the visible wavelength region (instant emission). Because of this property, it is suggested in Nuclear Instruments and Methods in Physics Research A, vol. 416(1998), pp. 333; IEEE Transaction on Nuclear Science, vol. 41(1994), No. 4, pp. 689; and ibid., vol. 47(2000), No. 6, pp. 1781, that the rare earth silicate phosphor be utilized as a scintillator, which is required to comprise phosphor packed densely enough to absorb radiation efficiently.

J. Phys. D: Appl. Phys., vol. 24 (1991), pp. 997–1002 describes preparation of $Y_2SiO_5$: (Ce, Sm) phosphor. The disclosed phosphor is prepared by a solid phase reaction method which comprises the steps of mixing $Y_2O_3$, $CeO_2$, $Sm_2O_3$, $SiO_2$ and $NH_4$ (flux) and firing the mixture.

JP-2-300,696A discloses a stimulable phosphor represented by the formula: $Y_xLu_yGd_zSiO_5$:aA,bB in which x, y and z are numbers satisfying the conditions of x+y+z=2, 0<x, 0≦y, 0≦z; A is Ce and/or Tb; B is Zr and/or Sm; and a and b are numbers satisfying the conditions of $2 \times 10^{-5}$<a<0.02 and $2 \times 10^{-5}$<b<0.02, respectively. The disclosed phosphor is prepared by a sol-gel method comprising the steps of: dissolving in diluted nitric acid $Y_2O_3$ and $Lu_2O_3$, $CeO_2$ and/or $TbO_2$, and oxide or nitrate of Zr and/or Sm; adding an alcohol and a tetraethyl orthosilicate to the obtained solution and then mixing them completely; adding diluted aqueous ammonia to the mixture to obtain a gel; and heating the gel at a temperature of 1,400 to 1,600° C.

JP-3,290,497B discloses a stimulable phosphor represented by the formula: $Y_{2-x}Ln_xSiO_5$·yM:zAc in which Ln is at least one rare earth element selected from the group consisting of Y, Gd and Lu; Ac is at least one element selected from the group consisting of Eu, Ce, Sm and Zr; M is at least one element selected from the group consisting of Al and Mg; and x, y and z are numbers satisfying the conditions of 0<x≦2, 0<y≦1.0 and 0<z≦0.1, respectively. The disclosed phosphor is prepared by a solid phase reaction method which comprises the steps of: mixing $Y_2O_3$ and/or $Lu_2O_3$, $SiO_2$ and an oxide of Ac; adding $AlF_3$ and/or $MgF_2$ to the mixture, and then mixing them again; and firing the obtained mixture.

IEEE Transaction on Nuclear Science, vol. 47(2000), No. 6, pp. 1781 discloses a process for preparation of lutetium silicate phosphor. The process comprises the steps of reacting lutetium metal with isopropanol to prepare a alkoxide and firing the alkoxide to obtain the lutetium silicate. According to this process, a phosphor giving high performances when used as a scintillator can be obtained by firing at 1,200° C. However, it is necessary in the process to use mercury, which is an undesirable substance from the environmental viewpoint.

SUMMARY OF THE INVENTION

An object of the present invention is to provide a new process for preparation of a rare earth silicate phosphor. In particular, the invention provides a process for preparation of a rare earth silicate phosphor efficiently absorbing radiation and giving strong simulated emission.

The present applicant has studied a process for preparation of a rare earth silicate, particularly silicate of a heavy rare earth such as lutetium. As a result, the applicant has found a new process by which the rare earth silicate phosphor can be easily prepared.

As is described above, in the conventional process, the rare earth silicate phosphor having good emission property is prepared by a process comprising melting or firing the starting materials at a very high temperature. In contrast, according to the new process, the rare earth silicate phosphor can be easily prepared at a relatively low temperature without using an unusual material. The thus-prepared phosphor is chemically stable and moisture-proof, and has excellent emission property.

The invention, in the first place, resides in a process for preparation of a phosphor represented by the formula (I):

$$Lu_xY_yGd_zSiO_p:aA,bL \qquad (I)$$

in which A is at least one element selected from the group consisting of Ce, Pr, Nd, Sm, Eu, Tb, Dy, Ho, Er, Tm, and Yb; L is at one element selected from the group consisting of Zr, Nb, Hf, Ta, Sn, Sm, Tm and Yb, provided that L differs from A; x, y and z are numbers satisfying the conditions of $0 \leq x$, $0 \leq y$, $0 \leq z$ and $1.5 \leq x+y+Z \leq 2.2$; p is a number to neutralize the phosphor in regard to electric charge thereof, a is a number satisfying the condition of $2 \times 10^{-5} < a < 6 \times 10^{-2}$, and b is a number satisfying the condition of $0 \leq b < 1 \times 10^{-2}$;

which comprises at least the steps of:

(1) heating a rare earth carboxylate represented by the formula (II):

$$(R^1-COO)_3M \cdot mH_2O \qquad (II)$$

in which M is at least one rare earth element selected from the group consisting of Lu, Y and Gd; $R^1$ is an aliphatic hydrocarbon group having 1 to 4 carbon atoms which may have either a substituent or no substituent; and m is a number satisfying the condition of $0 \leq m \leq 4$;

with an alkoxyalcohol represented by the formula (III), to obtain a solution:

$$R^2-O-(CH_2)_nOH \qquad (III)$$

in which $R^2$ is an aliphatic hydrocarbon group having 1 to 4 carbon atoms or a substituted aliphatic hydrocarbon group having 3 to 6 carbon atoms; and n is 2 or 3;

(2) adding the obtained solution a silicon alkoxide represented by the formula (IV):

$$Si(OR^3)_4 \qquad (IV)$$

in which $R^3$ is an aliphatic hydrocarbon group having 1 to 4 carbon atoms and a compound containing the element represented by A, and if required a compound containing the element represented by L, to prepare a mixture; and (3) subjecting the prepared mixture to thermal decomposition.

The invention, in the second place, resides in a process for preparation of a phosphor represented by the formula (I):

$$Lu_xY_yGd_zSiO_p:aA,bL \qquad (I)$$

in which A is at least one element selected from the group consisting of Ce, Pr, Nd, Sm, Eu, Tb, Dy, Ho, Er, Tm, and Yb; L is at one element selected from the group consisting of Zr, Nb, Hf, Ta, Sn, Sm, Tm and Yb, provided that L differs from A; x, y and z are numbers satisfying the conditions of $0 \leq x$, $0 \leq y$, $0 \leq z$ and $1.5 \leq x+y+Z \leq 2.2$; p is a number to neutralize the phosphor in regard to electric charge thereof, a is a number satisfying the condition of $2 \times 10^{-5} < a < 6 \times 10^{-2}$, and b is a number satisfying the condition of $0 \leq b < \times 10^{-2}$ which comprises at least the steps of:

(1) heating a rare earth carboxylate represented by the formula (II):

$$(R^1-COO)_3M \cdot mH_2O \qquad (II)$$

in which M is at least one rare earth element selected from the group consisting of Lu, Y and Gd; $R^1$ is an aliphatic hydrocarbon group having 1 to 4 carbon atoms which may have either a substituent or no substituent; and m is a number satisfying the condition of $0 \leq m \leq 4$;

with an alkoxyalcohol represented by the formula (III), to give a solution:

$$R^2-O-(CH_2)_nOH \qquad (III)$$

in which $R^2$ is an aliphatic hydrocarbon group having 1 to 4 carbon atoms or a substituted aliphatic hydrocarbon group having 3 to 6 carbon atoms; and n is 2 or 3;

(2) adding to the obtained solution a silicon alkoxide represented by the formula (IV):

$$Si(OR^3)_4 \qquad (IV)$$

in which $R^3$ is an aliphatic hydrocarbon group having 1 to 4 carbon atoms and a compound containing the element represented by A, and if required a compound containing the element represented by L, to prepare a mixture;

(3) bringing water into contact with the prepared mixture with water to prepare a gel; and (4) subjecting the prepared gel to thermal decomposition.

DETAILED DESCRIPTION OF THE INVENTION

In the first or second process of the invention, $R^1$ in the formula (II) preferably is methyl.

The alkoxyalcohol represented by the formula (III) preferably is at least one compound selected from the group consisting of 2-methoxyethanol, 2-ethoxyethanol, 1-methoxy-2-propanol, 1-ethoxy-2-propanol and 3-ethoxy-1-propanol.

The group $R^3$ in the formula (IV) preferably is ethyl.

The phosphor prepared by the first or second process of the invention is preferably represented by the formula (V):

$$Lu_xSiO_p:aA',bL' \qquad (V)$$

in which A' is at least one element selected from the group consisting of Ce and Tb; L' is at least one element selected from the group consisting of Zr, Hf, Sm and Yb, provided that L' differs from A'; x is a number satisfying the condition of $1.5 \leq x \leq 2.2$; p is a number to neutralize the phosphor in regard to electric charge thereof, and a is a number satisfying the condition of $2\times10^{-5}<a<6\times10^{-2}$, and b is a number satisfying the condition of $0\leq b<1\times10^{-2}$.

The first process of the invention preferably comprises the steps of:

(1) heating an acetate of Lu, Y and/or Gd together with 2-methoxyethanol and/or 2-ethoxyethanol, to obtain a solution;

(2) adding to the obtained solution tetraethoxysilane and a compound containing the element represented by A, and a compound containing the element represented by L, to prepare a mixture; and (3) subjecting the prepared mixture to thermal decomposition.

The second process of the invention preferably comprises the steps of:

(1) heating an acetate of Lu, Y and/or Gd together with 2-methoxyethanol and/or 2-ethoxyethanol, to obtain a solution;

(2) adding to the obtained solution tetraethoxysilane and a compound containing the element represented by A, and if required a compound containing the element represented by L, to prepare a mixture; and (3) bringing water into contact with the prepared mixture with water to give a gel; and (4) subjecting the given gel to thermal decomposition.

The processes of the invention are described below in detail.

[1] Step of Heating

A rare earth carboxylate and an alkoxyalcohol are heated together.

The rare earth carboxylate is represented by the formula (II):

$$(R^1\text{---COO})_3M.mH_2O \qquad (II)$$

in which M is at least one rare earth element selected from the group consisting of Lu, Y and Gd; $R^1$ is an aliphatic hydrocarbon group having 1 to 4 carbon atoms which may be either substituted or non-substituted; and m is a number satisfying the condition of $0\leq m\leq 4$.

Examples of the rare earth carboxylates include lutetium acetate, yttrium acetate, gadolinium acetate, lutetium methoxyacetate, lutetium hydroxyacetate, lutetium propionate, yttrium propionate, and gadolinium propionate. They may be either anhydrous salts or hydrates. Preferred are lutetium acetate, yttrium acetate, and gadolinium acetate in the form of anhydrous salts or hydrates. These rare earth carboxylates may be used singly or in combination according to the composition of the desired phosphor. The matrix of the phosphor is preferably constituted of lutetium or a combination of lutetium and yttrium.

Prior to the preparation of the phosphor, the rare earth carboxylate may be beforehand prepared in a reaction vessel. For example, a rare earth metal, its oxide or its hydroxide is dissolved in an excess amount of aqueous acetic acid, and then the excess acetic acid and water are distilled off to obtain the rare earth acetate.

The alkoxyalcohol is represented by the formula (III):

$$R^2\text{---O---}(CH_2)_n OH \qquad (III)$$

in which $R^2$ is an aliphatic hydrocarbon group having 1 to 4 carbon atoms or a substituted aliphatic hydrocarbon group having 3 to 6 carbon atoms; and n is a number of 2 or 3.

Examples of the alkoxyalcohols include 2-methoxy-ethanol, 2-ethoxyethanol, 1-methoxy-2-propanol, 1-ethoxy-2-propanol, 3-ethoxy-1-propanol, 2-(2-ethoxyethoxy)-ethanol, 2-(2-methoxyethoxy)ethanol, acetoxyethanol, 2-isopropoxyethanol, and 2-butoxyethanol. Preferred are 2-methoxyethanol, 2-ethoxyethanol, 1-methoxy-2-propanol, 1-ethoxy-2-propanol and 3-ethoxy-1-propanol. These alkoxy-alcohols may be used singly or in combination. Further, they may be used in the form of mixture with a compatible solvent such as dioxane, acetone, dimethylformamide or dimethylsulfoxide.

The rare earth carboxylate is dispersed in the alkoxyalcohol, and then heated. The amounts of the compounds are determined according to the composition of the desired phosphor, but the total amount of rare earth carboxylate is generally in the range of 0.01 to 1 mol, preferably in the range of 0.05 to 0.5 mol based on one liter of the alkoxy-alcohol. The temperature and period of time for heating are also determined according to the amounts and characters of the compounds, but the compounds are generally heated at a temperature of 100 to 150° C. for approx. 3 to 8 hours. After heating, the obtained solution may be condensed by distillation under reduced pressure.

[2] Step of Mixing

To the obtained solution (reaction mixture), a silicon alkoxide and one or more compounds of activator components are added and mixed. The silicon alkoxide is represented by the formula (IV)

$$Si(OR^3)_4 \qquad (IV)$$

in which $R^3$ is an aliphatic hydrocarbon group having 1 to 4 carbon atoms.

Examples of the silicon alkoxides (alkoxysilanes) include tetramethoxysilane, tetraethoxysilane, tetraisopropoxysilane, tetra-n-propoxysilane and tetraisobutoxy-silane. Tetraethoxysilane is particularly preferred.

The silicon alkoxide is added generally in an amount of 45 to 67 mol.% a based on the amount of rare earth in the rare earth carboxylate.

The compound of activator component A is a water-soluble salt of Ce, Pr, Nd, Sm, Eu, Tb, Dy, Ho, Er, Tm, and/or Yb. Examples of preferred components A include Ce and Tb. Most preferred is Ce. The compound of activator component B is a water-soluble salt of Zr, Nb, Hf, Ta, Sn, Sm, Tm, and/or Yb. Examples of a preferred components L include Zr and Sm. These compounds can be, for instance, salts, chelate compounds, or alkoxide compounds. Nitrates thereof are preferred. Zr, Hf, Nb, and/or Ta all of which belong to Group IV or V of the Periodic Table are preferably used as alkoxide compounds such as ethoxy compounds or isopropoxy compounds.

If the rare earth activated rare earth silicate phosphor is employed as a scintillator utilizing the instant emission only, the phosphor may contain only the activator component A. However, if the rare earth activated rare earth silicate phosphor is employed as a stimulable phosphor, the phosphor preferably contains the activator components A and B in combination. Preferred are a combination of Ce and Sm, and a combination of Ce and Zr.

The activator compound for the activator component A is added in an amount of 0.0005 to 3 mol. %, preferably 0.002 to 0.3 mol.% in terms of the activating element based on the total amount of rare earth elements (Lu, Y, Gd) (which constitute the phosphor matrix) contained in the rare earth carboxylate. If a compound for the activator component L is added, the compound is added in an amount of not more than 2 mol.%.

The silicon alkoxide and the activator compound(s) are preferably beforehand dissolved in a solvent such as isopropyl alcohol, and then added and mixed in the solution obtained by the heating step. Further, after they are added, the resulting solution is preferably heated again to give a homogeneous solution.

[3] Step of Gelation

Thus-obtained mixture is then brought into contact with water or water vapor to prepare a gel.

In the present invention, it is not always necessary to perform the step of gelation. After the silicon alkoxide and the activator compound are added to the reaction mixture obtained by the heating step, the solvent may be distilled off, if needed, and then the resulting mixture may be directly subjected to the step of thermal decomposition (the first process of the invention). However, prior to the step of thermal decomposition, the mixture is preferably converted into a gel (the second process of the invention).

For preparing the gel, water diluted with a water-compatible solvent may be added to the mixture, or otherwise the mixture may be exposed to humid air. The solvent of the mixture is preferably removed by distillation before the gelation.

[4] Step of Thermal Decomposition

The obtained gel is then subjected to thermal decomposed.

The gel is placed in a heat-resistant container such as an alumina crucible, a platinum crucible or a quartz boat, and then fired in an electric furnace. The firing temperature is generally in the range of 800 to 1,700° C. The period of time for firing is normally in the range of 1 to 18 hours, preferably in the range of 2 to 12 hours, although depending upon various conditions such as the amount of the gel, the firing temperature and the temperature at which the fired gel is taken out of the furnace. The gel may be fired under not only air atmosphere or nitrogen gas atmosphere but also an atmosphere in the presence of carbon, both water vapor and hydrogen gas or both carbon monoxide and carbon dioxide. The firing may be carried out once, but the gel may be fired twice or more with the temperature and the atmosphere changed.

Prior to the firing, the gel may be crushed into particles. Further, in order to perform the firing efficiently, a small amount of fluoride (e.g., $NH_4F$, $AlF_3$, $MgF_2$) may be added as a flux to the gel.

Organic components and water in the gel are decomposed and/or removed by the firing, and thus the gel is converted into a silicate of complex oxide.

The obtained product may be, if needed, subjected to various treatments (such as crushing and sieving) that are generally carried out in the preparation of phosphors. Further, for ensuring the high emission property, the product may be annealed. In that case, the temperature range for annealing must be controlled so that the resultant phosphor particles may not sinter.

Thus, a rare earth silicate phosphor represented by the formula (I) can be prepared. In consideration of radiation-absorption efficiency and emission intensity, the phosphor of the invention preferably comprises a matrix mainly containing lutetium as the rare earth matrix component. Particularly preferably, the phosphor of the invention is represented by the formula (V).

$Lu_xSiO_p:aA',bL'$ (V)

in which A' is at least one element selected from the group consisting of Ce and Tb; L' is at least one element selected from the group consisting of Zr, Hf, Sm and Yb, provided that L' differs from A'; x is a number satisfying the condition of $1.5 \leq x \leq 2.2$; p is a number to neutralize the phosphor in regard to electric charge thereof, and a is a number satisfying the condition of $2 \times 10^{-5} < a < 6 \times 10^{-2}$, and b is a number satisfying the condition of $0 \leq b < 1 \times 10^{-2}$.

The crystal structure of the obtained phosphor can be assigned according to the X-ray diffraction method. For example, the silicate phosphor mainly comprising lutetium gives a diffraction pattern of JCPDS card No. 410239. The phosphor of the invention may have a complex structure consisting of crystalline portions and amorphous portions.

The phosphor particles have an average size of generally 0.05 to 20 μm, preferably 0.5 to 10 μm. The phosphor particle may be a single crystal or a secondary particle such as a polycrystal or aggregate consisting of crystallites having sizes of 10 to 500 nm.

The rare earth silicate phosphor thus prepared according to the invention gives stimulated emission when exposed to electromagnetic wave in a wide wavelength region ranging UV light to radiation, and accordingly it can be utilized to various known uses. In particular, the phosphor can be advantageously used either in the aforementioned radiation image recording and reproducing method (in which a radiation image storage panel is alone used) or in the radiation image forming method (in which a radiation image storage panel is used in combination with a phosphor screen, which may be unified with the storage panel).

A radiation image storage panel comprising the phosphor of the invention is described below.

The radiation image storage panel at least has a stimulable phosphor layer containing the stimulable phosphor of the invention by which radiation energy is absorbed and stored. The phosphor layer may be a self-supporting sheet, but is normally provided on a support. On the phosphor layer, a protective film is preferably provided. For increasing sharpness of the resultant image, the phosphor layer and/or the protective film may contain a colorant which does not absorb the stimulated emission but the stimulating rays, or otherwise an intermediate layer containing that colorant may be provided. Other intermediate layers such as a light-reflecting layer and an adhesive layer may be provided, if needed.

The radiation image storage panel may have a radiation-absorbing phosphor layer as well as the stimulable phosphor layer. The radiation-absorbing phosphor layer is placed next to the stimulable phosphor layer, and contains a phosphor which imagewise absorbs radiation and instantly emits ultraviolet or visible light. In that case, the stimulable phosphor of the invention, which is contained in the stimulable phosphor layer, absorbs the light emitted by the radiation-absorbing phosphor layer and gives stimulated emission when exposed to stimulating rays of secondary excitation. These phosphor layers are formed in a pair. Also in the storage panel having the radiation-absorbing phosphor layer, the above-described support, protective film and intermediate layers can be provided.

[Support]

The support of the storage panel may be made of any material having smooth plane. Examples of the supports include a polymer sheet, a plate of metal such as aluminum, a ceramic plate, and a glass plate. The support may be transparent, or may contain light-reflecting substances (e.g., particles of alumina, titanium dioxide or barium sulfate) that reflect the stimulating light or stimulated emission. Further, it may contain voids or light-absorbing substances (e.g., carbon black) that absorb stimulating rays or stimulated emission.

Examples of the polymer sheets include sheets of various resins such as polyethylene terephthalate, poly-ethylene naphthalate, aramide resin and polyimide resin. The polymer sheet has a thickness of preferably 50 μm to 1 mm, more preferably 120 to 350 μm. The polymer sheet may be provided on another substrate such as a sheet of carbon fiber or aluminum.

[Protective Film]

On the surface of the phosphor layer, a protective film may provided to protect the layer chemically and physically. The protective film is preferably transparent enough not to affect the stimulating rays and the stimulated emission, and is also preferably enough chemically stable and physically strong to keep the phosphor layer from chemical deterioration or physical shock. The protective film can be formed by various method, for example, by coating the phosphor layer with a solution of transparent organic polymer (e.g., cellulose derivatives, polymethylmethacrylate, fluorine resin soluble in organic solvents) dissolved in an appropriate solvent, by fixing a beforehand prepared transparent sheet (e.g., a glass plate, a film of organic polymer such as polyethylene-terephthalate) with adhesive, or by depositing inorganic materials on the phosphor layer. Various additives such as a slipping agent (e.g., powders of perfluoroolefin resin and silicone resin) and a crosslinking agent (e.g., polyisocyanate) may be dispersed in the protective film.

The protective film is preferably made to be light-scattering in a certain degree so as to increase sharp-ness of the resultant radiation image. The protective film generally gives a scattering length of 5 to 80 μm, preferably 10 to 70 μm, at the main wavelength of the stimulated emission from the stimulable phosphor. The light-scattering protective film can be formed by dispersing light-scattering fine particles in the aforementioned material for the film. The light-scattering fine particles have a refractive index of preferably 1.6 or more, more preferably 1.9 or more, and sizes of preferably 0.1 to 1.0 μm, more preferably 0.1 to 0.5 μm. Examples of the light-scattering fine particles include fine particles of benzoguanamine resin, melamine-formaldehyde condensed resin, zinc oxide, zinc sulfide, and titanium oxide.

For enhancing the resistance to stain, a fluororesin layer may be provided on the protective film. The fluororesin layer can be form by coating the surface of the protective film with a solution in which a fluororesin is dissolved (or dispersed) in an organic solvent, and drying the applied solution. The fluororesin may be used singly, but a mixture of the fluororesin and a film-forming resin is normally employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluoro-resin layer is generally in the range of 0.5 to 20 μm. For forming the fluororesin layer, additives such as a crosslinking agent, a film-hardening agent and an anti-yellowing agent can be used. In particular, the cross-linking agent is advantageously employed to improve durability of the fluororesin layer.

The protective film or the fluororesin layer has a coefficient of maximum friction in the range of preferably 0.18 or less, more preferably 0.12 or less, so that the storage panel can be easily handled when installed in and taken out of a cassette for recording. The average surface roughness is also preferably in the range of 0.05 to 0.5 μm, more preferably in the range of 0.1 to 0.3 μm. For example, a great number of very small convexes or concaves may be formed by embossing on the surface of the protective film or the fluororesin layer.

It is also preferred that anti-static materials be incorporated in the protective film or other layers so as to prevent the storage panel from electrification. If the panel is electrified, static marks are often made by discharge. In recording the radiation image, the electric charge on the panel is preferably removed before installation in the cassette.

The protective film has a thickness of generally approx. 1 to 20 μm, preferably 3 to 15 μm.

[Phosphor Layer]

The phosphor layer comprising the phosphor of the invention generally is a layer in which particles of the phosphor are dispersed in a binder. The phosphor layer, however, may comprise agglomerate of the phosphor without binder, or otherwise may comprise the agglomerated phosphor soaked with a polymer. The phosphor layer comprising a binder and the phosphor particles dispersed therein can be prepared in the following manner.

First, the phosphor particles and a binder are well mixed in an organic solvent to prepare a coating liquid in which the particles are homogeneously dispersed in the organic solution of binder. The binder can be optionally selected from known various resins conventionally used as a binder. Examples of the binder include gum arabic, dextran, polyvinyl acetate, hydroxyethyl cellulose, polymethyl methacrylate, polybutyl methacrylate, polyurethane and polyvinyl alcohol. The ratio between the binder and the phosphor in the liquid depends on the characteristics of the phosphor and the aimed property of the panel, but is generally in the range of 1 to 0.01 (binder/phosphor, by weight). The coating liquid may contain a dispersing agent to assist the phosphor particles in dispersing, and also contain other additives such as a plasticizer for increasing bonding between the binder and the phosphor particles, an anti-yellowing agent for preventing the phosphor layer from yellowing, a film-hardening agent and a crosslinking agent.

Thus prepared coating liquid is evenly applied on the support by known coating means such as doctor blade, roll coater and knife coater, and then dried to form a stimulable phosphor layer. The phosphor layer may be formed by other procedures, namely, applying the above coating liquid onto a temporary support (e.g., glass plate, metal plate, plastic sheet), drying the applied liquid to form a phosphor sheet, peeling off the phosphor sheet, and then providing the phosphor sheet with adhesive or by pressing onto the support.

The phosphor layer may be a single layer or may consist of two or more sub-layers. For example, the phosphor layer preferably consists of two sub-layers comprising phosphors having the same composition but different sizes to prevent light-scattering in the phosphor layer. The above-mentioned procedure can be also used to prepare a radiation image storage panel in which the radiation-absorbing phosphor layer and the stimulable phosphor layer are separately provided so that the stimulable phosphor layer can absorb ultraviolet light emitted from the radiation-absorbing phosphor layer. In that case, the phosphor layers can be successively formed.

The thickness of the stimulable phosphor layer depends on the structure of the storage panel. In a normal storage panel in which the stimulable phosphor layer absorbs radiation, the thickness is generally in the range of 50 to 500 μm, preferably in the range of 100 to 300 μm. In a storage panel comprising both of the radiation-absorbing phosphor layer and the stimulable phosphor layer, it is generally in the range of 1 to 50 μm, preferably in the range of 5 to 20 μm.

[Instantly Emitting Phosphor]

In the radiation image storage panel in which the radiation-absorbing phosphor layer and the stimulable phosphor layer are separately provided so that the stimulable phosphor layer can absorb ultraviolet light emitted by the radiation-absorbing phosphor layer, the radiation-absorbing phosphor layer contains an instantly emitting phosphor which comprises an element having an atomic number of 37 or more as a main component of the matrix and which has a higher true density than the phosphor of the invention. Examples of the instantly emitting phosphor include $LnTaO_4$: (Nb, Gd, Tm), $LnAlO_3$:Ce and $Lu_2O_3$:Gd. The thickness of the instantly emitting phosphor layer (radiation-absorbing phosphor layer) is generally in the range of 50 to 500 μm, preferably in the range of 100 to 300 μm.

The instantly emitting phosphor preferably gives instant emission whose wavelength range covers 70% or more of the wavelength range of the primary excitation for the stimulable phosphor. Here, the term "wavelength range" means a wavelength region in which the intensity is 10% or more based on the intensity at the maximum peak of the instant emission spectrum or the primary excitation spectrum.

The phosphor layer may comprise a binder and the phosphor particles dispersed therein, may comprise agglomerate of the phosphor without binder, or otherwise may comprise the agglomerated phosphor soaked with a polymer.

[Partition]

In the radiation-absorbing phosphor layer and/or the stimulable phosphor layer, a partition may be optionally provided to reduce scattering and to increase sharpness of the resultant image. The partition is placed so that the plane of the layer may be divided into small sections. Since the phosphor layer is relatively thick, the partition effectively prevents the emission from diffusing. The partition may be in a desired shape such as stripes or grating. It is also possible to enclose the phosphor with the partition in any shape such as circle or hexagon. Both of the top and the bottom of the partition may appear on the surfaces of the layer, or otherwise one or both of them may be buried in the layer.

The partition can be provided, for example, in the following manner. First, a sheet or plate of metal (e.g., aluminum, titanium, stainless steel), ceramics (e.g., aluminum oxide, aluminum silicate) or organic polymer material (photo-sensitive resin) is subjected to a proper etching treatment, to prepare a honeycomb sheet having many dimples (holes) or porosities. The above-described phosphor layer is then placed on the prepared honeycomb sheet, and heated and pressed so that the sheet may be pushed into the phosphor layer. As a result, a phosphor layer comprising a honeycomb partition can be thus obtained. Otherwise, many thin phosphor sheets comprising a binder and the phosphor particles dispersed therein are beforehand prepared. Independently, many thin partition sheets made of polymer material are also beforehand prepared. The phosphor sheets and the partition sheets are alternatively piled up to prepared a layered composition, and then the composition is perpendicularly sliced off. The obtained slice is a phosphor sheet comprising a striped partition. The partition can contain low-light-absorbing fine particles such as aluminum oxide or titanium oxide, or may contain colorant that selectively absorbs the instant emission from the radiation-absorbing phosphor. The partition may be made of materials of the phosphor layer. (In that case, however, the ratio of binder/phosphor and the size of phosphor particles are different from those for forming the phosphor layer.)

The radiation image storage panel may comprise other layers such as a selectively-reflecting layer and a diffusing-reflecting layer.

[Colorant]

For increasing sharpness of the radiation image, at least one layer in the radiation image storage panel may be colored with a colorant which absorbs the (instant) emission from the instantly emitting phosphor and/or the stimulating rays of secondary excitation [which are applied to the stimulable phosphor layer in reading out a latent (stored radiation) image] or, in some cases, with a colorant which partly absorbs the (stimulated) emission from the stimulable phosphor. Practically, the phosphor layer, the protective film or an intermediate layer such as an undercoating layer is colored with the colorant absorbing the emission from the instantly emitting phosphor and/or the stimulating rays of secondary excitation. One of the above layers may be singly colored, or they may be colored partly in any combination. If the radiation image stored in the panel is read out with a photomultiplier tube in the point-detecting system described after, it is preferred for the colorant not to absorb the emission from the stimulable phosphor.

For the radiation image storage panel in which the stimulable phosphor layer directly absorbs radiation, the colorant is selected according to the properties of the phosphor so that the stimulating rays of secondary excitation may not be transmitted but the stimulated emission may be. The colorant used in many normal cases does not transmit red light but blue to green light.

For the radiation image storage panel comprising the instantly emitting phosphor (which absorbs radiation and instantly emits light) and the stimulable phosphor (which absorbs the light emitted from the instantly emitting phosphor and gives stimulated emission when exposed to the stimulating rays of secondary excitation) in combination, the colorant is selected so that it may absorb both of the instant emission and the stimulating rays of secondary excitation. For example, in the case where the instantly emitting phosphor emits green light and the stimulable phosphor absorbs it and gives stimulated emission in the red wavelength region when exposed to near infrared rays of secondary excitation, the colorant preferably does not absorb red light but green light and near infrared rays (if the radiation image is read out in the point-detecting system). Two or more colorants may be used in combination.

The colorant suitable for the above case is a red colorant. Examples of the red colorant include inorganic pigments such as cadmium red, red iron oxide and molybdenum red. These red colorants, however, scarcely absorb near infrared light, and hence are preferably used in combination with near infrared-absorbing substances such as cyanine dye, indoaniline dye and squarilium dye.

In the case where the instantly emitting phosphor emits near ultraviolet light and the stimulable phosphor absorbs it and gives stimulated emission in the blue to green wavelength region when exposed to red light of secondary excitation, the colorant preferably does not absorb blue to green light but near ultraviolet and red light (if the radiation image is read out in the point-detecting system). The colorant suitable for that case is a blue or green colorant.

If the radiation image is read out not in the point-detecting system employing a photomultiplier tube but in a line-detecting system employing a line sensor, the instantly emitting phosphor layer and the intermediate layer such as the undercoating layer are preferably colored with a colorant which absorbs the instant emission from the instantly emitting phosphor, the simulating rays of secondary excitation for the stimulable phosphor and/or the stimulated emission from the stimulable phosphor. If the stimulated emission diffuses out of the area having been exposed to the simulating rays of secondary excitation, the resultant image is liable to get blurred. In the case where the radiation-absorbing phosphor emits green light and the stimulable phosphor absorbs it and gives stimulated emission in the red wave-length region when exposed to near infrared rays of secondary excitation, the colorant preferably absorbs green, red and/or near infrared light. In other words, a red, blue, green or gray colorant absorbing near infrared light is preferred. The above-described red colorants are usable. Examples of the blue or green colorant absorbing near infrared light include titanyl phthalocyanine TiO—Pc (Sanyo Dye Co., Ltd.). The above-described blue or green colorants may be used in combination with infrared-absorbing substances. Examples of the gray colorant include carbon black and Cu—Fe—Mn oxide.

The present invention is further described by the following examples.

EXAMPLE 1

Preparation of $Lu_2SiO_5$:0.001Ce Phosphor 21.2 g of lutetium acetate tetrahydrate was dispersed in 500 ml of ethoxyethanol, and then the prepared dispersion was refluxed at 136° C. for 7 hours to remove approx. 170 ml of distillate. To the obtained pale yellow transparent liquid, a mixture of 5.86 ml of tetraethoxysilane and 11 mg of cerium nitrate hexahydrate dissolved in 50 ml of isopropanol was added. The reaction liquid was refluxed for 2 hours to mix well, and then the solvent was distilled off at 90° C. under reduced pressure (approx. 10 mmHg) to obtain viscous yellow liquid of precursor. The liquid of precursor was spread in a glass laboratory dish, and exposed to atmospheric humidity for approx. 10 hours. Thus, transparent yellow glassy gel was prepared.

The gel was crushed, and the obtained particles were made to have even sizes. After stuffed in an alumina crucible, the gel particles were placed in the core of a muffle furnace and then fired at 1,000° C. for 1 hour under air atmosphere. Further, the firing was successively carried out again at the temperature set forth in Table 1 for 4 hours under slightly reductive atmosphere in the presence of a little carbon. Thus, $Lu_2SiO_5$:0.001Ce phosphors A to D were prepared according to the invention.

Evaluation of Phosphor (1)

The crystal structures of the obtained phosphors A to D were analyzed by the X-ray diffraction method.

In addition, the intensity of stimulated emission given by each phosphor was evaluated in the following manner. Each of the phosphors A to D was stuffed in a dimple (250 μm) of a holder for measurement, and exposed to X-rays of 40 kVp in the amount of 4.6 $J/m^2$ (200 mR). After 10 seconds, each phosphor was exposed to He—Ne laser (wavelength: 633 nm) and thereby given stimulated emission was detected through an optical filter (B-410) with a photomultiplier tube. The amount of emission was integrated for 10 seconds since the emission began to come out, and reduced to a relative value for evaluating the intensity of stimulated emission.

The results are set forth in Table 1.

TABLE 1

| Phosphor | Precursor | Temp. of 2nd firing | Crystal | Stimulated emission $\lambda_{max}$ | Intensity |
|---|---|---|---|---|---|
| Ex. 1-A | Gel | 1,100° C. | LSO* | 400 nm | 50 |
| Ex. 1-B | Gel | 1,200° C. | LSO* | 400 nm | 70 |
| Ex. 1-C | Gel | 1,400° C. | LSO* | 400 nm | 98 |
| Ex. 1-D | Gel | 1,600° C. | LSO* | 400 nm | 101 |

*LSO: The crystal gave a diffraction pattern of JCPDS card No. 410239.

The results shown in Table 1 indicate that, according to the invention, the aimed lutetium orthosilicate (LSO) salt can be prepared by firing even at 1,100° C. Namely, the present invention makes it possible to obtain a phosphor giving strong stimulated emission by firing even at a relatively low temperature.

EXAMPLE 2

Preparation of $Lu_2SiO_5$:0.001Ce, A''' Phosphor (A''': Co-Activator)

21.2 g of lutetium acetate tetrahydrate was dispersed in 500 ml of ethoxyethanol, and then the prepared dispersion was refluxed at 136° C. for 7 hours to remove approx. 170 ml of distillate. To the obtained pale yellow transparent liquid, a mixture of 5.86 ml of tetraethoxysilane, 7 mg of triethoxy cerium and each co-activator shown in Table 2 dissolved in 50 ml of isopropanol was added. The reaction liquid was refluxed for 2 hours to mix well, and then the solvent was distilled off at 90° C. under reduced pressure (approx. 10 mmHg) to obtain viscous yellow liquid of precursor. The liquid of precursor was spread in a glass laboratory dish, and exposed to atmospheric humidity for approx. 10 hours. Thus, transparent yellow glassy gel was prepared.

The gel was crushed, and the obtained particles were made to have even sizes. After stuffed in an alumina crucible, the gel particles were placed in the core of a muffle furnace and then fired at 1,000° C. for 1 hour under air atmosphere. Further, the firing was successively carried out again at 1,400° C. for 4 hours under slightly reductive atmosphere in the presence of a little carbon. Thus, the phosphors E to I were prepared according to the invention.

TABLE 2

| Phosphor | Co-activator | Amount of co-activator (mole per 1 mole of Lu) |
|---|---|---|
| E | Tetraisopropoxy zirconium | $5 \times 10^{-4}$ |
| F | Tetraisopropoxy zirconium | $2.5 \times 10^{-4}$ |
| G | Triisopropoxy samarium | $5 \times 10^{-4}$ |
| H | Triisopropoxy samarium | $2.5 \times 10^{-4}$ |
| I | — | — |

Evaluation of Phosphor (2)

The intensity of stimulated emission given by each of the prepared phosphors E to I was evaluated in the above-described manner.

The results are set forth in Table 3.

TABLE 3

| Phosphor | Composition | Intensity of stimulated emission |
|---|---|---|
| E | $Lu_2SiO_5$:0.001Ce, 0.001Zr | 150 |
| F | $Lu_2SiO_5$:0.001Ce, 0.0005Zr | 120 |
| G | $Lu_2SiO_5$:0.001Ce, 0.001Sm | 160 |
| H | $Lu_2SiO_5$:0.001Ce, 0.0005Sm | 130 |
| I | $Lu_2SiO_5$:0.001Ce | 90 |

The results shown in Table 2 indicate that, according to the invention, the stimulated emission is enhanced by the co-activator Zr or Sm used together with the activator Ce.

EXAMPLE 3

Preparation of $Lu_xY_ySiO_5$:0.001Ce, 0.001Sm Phosphor

The procedures of Example 1 were repeated except that lutetium acetate tetrahydrate was partly or fully replaced with an equivalent amount of yttrium acetate, that cerium nitrate hexahydrate was replaced with an equivalent amount of triethoxy cerium and triisopropoxy samarium as the co-activator and that the second firing was carried out at 1,400° C. Thus, the phosphors J to N were prepared according to the invention.

Evaluation of Phosphor (3)

The intensity of stimulated emission given by each of the prepared phosphors J to N was evaluated in the above-described manner.

The results are set forth in Table 4.

TABLE 4

| Phosphor | Composition | Intensity of stimulated emission |
|---|---|---|
| J | $LuYSiO_5$:0.001Ce, 0.001Sm | 120 |
| K | $Lu_{1.5}Y_{0.5}SiO_5$:0.001Ce, 0.001Sm | 130 |
| L | $Lu_{1.8}Y_{0.2}SiO_5$:0.001Ce, 0.001Sm | 150 |
| M | $Lu_{1.8}SiO_{4.7}$:0.0009Ce, 0.0009Sm | 180 |
| N | $Y_2SiO_5$:0.001Ce, 0.001Sm | 72 |

The results shown in Table 4 indicate that, according to the invention, the stimulated emission is enhanced by increasing the ratio of Lu per Y in the phosphor matrix.

EXAMPLE 4

Adjustment of Firing Atmosphere

A gel prepared in the same manner as in Example 1 was pulverized. The pulverized gel was adjusted to particle size adjustment. The particle size adjusted pulverized gel was placed in an alumina crucible, and the crucible was placed in the core of a muffle furnace and then fired at 1,200° C. for 1 hour under air atmosphere. The crucible was transferred into the core of a tube furnace and fired at 1,400° C. for 4 hours, under controlling the water vapor partial pressure and hydrogen pressure so as to control an equilibrium oxygen partial pressure in the core area (see the partial pressure set forth in Table 5).

Each of the phosphors O to S was stuffed in a dimple (250 μm) of a holder for measurement and exposed to X-rays of 40 kVp in the amount of 4.6 J/m² (200 mR). The instant emission spectrum and its peak intensity given by each phosphor was measured.

The results are set forth in Table 5.

TABLE 5

| | | Instant Emission | |
|---|---|---|---|
| Phosphor | Equilibrium $O_2$ pressure | Wavelength (nm) | Intensity (relative value) |
| O | $<10^{-14}$ | 400 | 20 |
| P | $10^{-11}$ | 400 | 120 |
| Q | $10^{-10}$ | 400 | 250 |
| R | $10^{-9}$ | 400 | 290 |
| S | $10^{-8}$ | 400 | 300 |

As is apparent from the data in Table 5, the process of the invention gives rare earth activated rare earth silicate phosphors producing instant emission of a high intensity by adjusting the firing atmosphere.

EXAMPLE 5

A radiation image storage panel comprising the phosphor E of Example 2 was prepared in the following manner.

(Preparation of Coating Liquid for Phosphor Layer)

In a mixed solvent of methyl ethyl ketone-toluene (1:1), 356 g of the phosphor E of Example 2, 15.8 g of polyurethane resin (Desmorac 4125 [trade name], available from Sumitomo Bayer Urethane Co., Ltd.) and 2.0 g of Bisphenol A epoxy resin were added and mixed by means of propeller mixer, to prepare a coating liquid for phosphor layer (Preparation of Coating Liquid for Protective Film)

Into a mixed solvent of toluene-isopropanol (1:1), 70 g of fluoroethylene-vinyl ether copolymer (Lumiflon LF504X [trade name], available from Asahi Glass Co., Ltd.), 25 g of isocyanate (Desmodule Z4370 [trade name], available from Sumitomo Bayern Urethan Co., Ltd.), 5 g of bisphenol A epoxy resin and 10 g of silicone resin powder (KMP-590 [trade name], available from The Shin-Etsu Chemical Co., Ltd.; grain size: 1 to 2 μm) were added, to prepare a coating liquid for protective film.

(Formation of Phosphor Layer and Protective Film)

The above-prepared coating liquid for phosphor layer was applied onto a polyethylene terephthalate film beforehand provided with an undercoating layer, and dried at 100° C. for 15 minutes to form a stimulable phosphor layer of 350 μm thickness. The coating liquid for protective film was then applied onto the phosphor layer, and dried at 120° C. for 30 minutes, to form a protective film of 10 μm thickness. Thus, a radiation image storage panel comprising a support, a phosphor layer and a protective film was produced.

(Test for Detecting Radiation Image Pattern)

The prepared storage panel was exposed to 1 mR of a convergent beam of X-rays emitted by an X-ray generator of 80 kVp. After 30 seconds, the panel was scanned with a semiconductor laser bean (633 nm). Through a band-pass filter transmitting light in the wavelength range of 380 to 500 nm, the stimulated emission was detected with a photomultiplier tube. As a result, it was confirmed that the signals obtained from the spot having been exposed to the X-rays were much stronger than those from the area having not been exposed. This means the storage panel can give a radiation image clearly enough to be practically used.

In the invention, a rare earth alkoxide preferably in the form of gel is thermally decomposed and thereby a rare earth silicate phosphor can be easily prepared at a lower temperature than in a conventional process without using an unusual material. The thus-prepared phosphor, particularly the phosphor comprising lutetium, highly absorbs radiation and gives strong stimulated emission, and in addition is chemically stable and moisture-proof. The phosphor prepared according to the invention, therefore, can be advantageously used not only as a stimulable phosphor in the radiation image recording and reproducing method or in the radiation image forming method but also as a scintillator or as a phosphor of a radiographic intensifying screen in the radiography.

What is claimed is:

1. A process for preparation of a stimulable phosphor represented by the formula (I):

$$Lu_x Y_y Gd_z SiO_p \cdot aA, bL \qquad (I)$$

in which A is at least one element selected from the group consisting of Ce, Pr, Nd, Sm, Eu, Tb, Dy, Ho, Er, Tm, and Yb; L is at one element selected from the group consisting of Zr, Nb, Hf, Ta, Sn, Sm, Tm and Yb, provided that L differs from A; x, y and z are numbers satisfying the conditions of $0 \leq x$, $0 \leq y$, $0 \leq z$ and $1.5 \leq x+y+Z \leq 2.2$; p is a number to neutralize the phosphor in regard to electric charge thereof, a is a number satisfying the condition of $2 \times 10^{-5} < a < 6 \times 10^{-2}$, and b is a number satisfying the condition of $0 \leq b < 1 \times 10^{-2}$, in which the stimulable phosphor absorbs and stores a portion of energy of radiation or ultraviolet rays when it is exposed to the radiation or ultraviolet rays, and emits stimulated light in a visible wavelength region when exposed to electromagnetic waves;

which comprises the steps of:

(1) heating a rare earth carboxylate represented by the formula (II)

$$(R^1-COO)_3 M \cdot mH_2O \qquad (II)$$

in which M is at least one rare earth element selected from the group consisting of Lu, Y and Gd; $R^1$ is an aliphatic hydrocarbon group having 1 to 4 carbon atoms which has a substituent or no substituent; and m is a number satisfying the condition of $0 \leq m \leq 4$;

with an alkoxyalcohol represented by the formula (III), to obtain a solution:

$$R^2-O-(CH_2)_n OH \qquad (III)$$

in which $R^2$ is an aliphatic hydrocarbon group having 1 to 4 carbon atoms or a substituted aliphatic hydrocarbon group having 3 to 6 carbon atoms; and n is 2 or 3;

(2) adding to the obtained solution a silicon alkoxide represented by the formula (IV):

$$Si(OR^3)_4 \qquad (IV)$$

in which $R^3$ is an aliphatic hydrocarbon group having 1 to 4 carbon atoms and a compound containing the element represented by A, and if required a compound containing the element represented by L, to prepare a mixture;

(3) bringing water into contact with the prepared mixture to give a gel; and (4) subjecting the given gel to thermal decomposition under slightly reductive atmosphere.

2. The process of claim 1, wherein $R^1$ in the formula (II) is methyl.

3. The process of claim 1, wherein the alkoxy-alcohol represented by the formula (III) is at least one compound selected from the group consisting of 2-methoxyethanol, 2-ethoxyethanol, 1-methoxy-2-propanol, 1-ethoxy-2-propanol and 3-ethoxy-1-propanol.

4. The process of claim 1, wherein $R^3$ in the formula (IV) is ethyl.

5. The process of claim 1, comprising the steps of (1) heating a rare earth carboxylate that is an acetate of at least one element selected from the group consisting of Lu, Y, and Gd with at least one alcohol that is an alkoxyalcohol selected from the group consisting of 2-methoxyethanol and 2-ethoxyethanol, to obtain a solution;

(2) adding to the obtained solution a silicon alkoxide that is tetraethoxysilane and a compound containing the element represented by A, and if required a compound containing the element represented by L, to prepare a mixture; and (3) bringing water into contact with the prepared mixture, to give a gel; and (4) subjecting the given gel to thermal decomposition.

6. The process of claim 1, wherein the phosphor is represented by the following formula (V):

$$Lu_x SiO_p \cdot aA', bL' \qquad (V)$$

in which A is A' and is at least one element selected from the group consisting of Ce and Tb; L is L' and is at least one element selected from the group consisting of Zr, Hf, Sm and Yb, provided that L' differs from A'; x is a number satisfying the condition of $1.5 \leq x < 2.2$; y is zero; z is zero; p is a number to neutralize the phosphor in regard to electric charge thereof, and a is a number satisfying the condition of $2 \times 10^{-5} < a < 6 \times 10^{-2}$; and b is a number satisfying the condition of $0 \leq b < 1 \times 10^{-2}$.

* * * * *